United States Patent [19]
Sakai et al.

[11] Patent Number: 5,104,753
[45] Date of Patent: Apr. 14, 1992

[54] HYDROGEN STORAGE ELECTRODE AND PROCESS FOR PRODUCING THE SAME

[75] Inventors: Tetsuo Sakai, Amagasaki; Hiroshi Ishikawa, Ikeda; Atsushi Takagi, Kariya, all of Japan

[73] Assignees: Kabushiki Kaisha Toyoda Jidoshokki Seisakusho, Kariya; Agency of Industrial Science & Technology, Tokyo, both of Japan

[21] Appl. No.: 576,701

[22] Filed: Aug. 31, 1990

[30] Foreign Application Priority Data

Sep. 11, 1989 [JP] Japan .................. 1-235144
Dec. 21, 1989 [JP] Japan .................. 1-331679

[51] Int. Cl.⁵ .......................................... H01M 4/86
[52] U.S. Cl. .................................. 429/40; 427/115; 29/623.5
[58] Field of Search .............. 427/115; 29/623.5; 429/40

[56] References Cited

U.S. PATENT DOCUMENTS 4,799,360 1/1989 Retallick et al. .............. 427/387

FOREIGN PATENT DOCUMENTS

16470 1/1986 Japan .
101957 5/1986 Japan .

*Primary Examiner*—Asok Pal
*Attorney, Agent, or Firm*—Brooks Haidt Haffner & Delahunty

[57] ABSTRACT

Disclosed are a hydrogen storage electrode and a process for producing the same. The process includes the steps of: coating the surface of hydrogen storage alloy powder with copper or nickel, thereby making the hydrogen storage alloy powder into microcapsule; mixing the microcapsule with uncrosslinked silicone rubber and/or powder for forming porosity; and pressure molding the mixture of the microcapsule, the uncrosslinked silicone rubber and/or the powder for forming porosity, thereby completing the crosslinking of the uncrosslinked silicone rubber during or after the pressure molding. The hydrogen storage electrode has a reduced capacity deterioration characteristic during a high rate electric discharge and an extended charge and discharge cycle life, since the silicone rubber binds the neighboring mecorcapsules elastically, thereby preventing the microcapsules including the hydrogen storage powder from coming off, and since the powder for forming porosity forms microspaces on the boundaries between itself and the silicone rubber, thereby improving the hydrogen permeability and reducing the internal electric resistance.

19 Claims, 8 Drawing Sheets

HYDROGEN STORAGE ELECTRODE AND PROCESS FOR PRODUCING THE SAME

BACKGROUND OF THE INVENTION

1. Field of the Invention

The present invention relates to a hydrogen storage electrode and a process for producing the same. The hydrogen storage electrode is employed as an anode of an alkaline secondary battery in which hydrogen is utilized as an anode active material. The present invention particularly relates, for instance, to a process for producing a hydrogen storage electrode enabling to produce a large-sized electrode easily and intending to improve the electric discharging characteristic of an electrode.

2. Description of the Prior Art

A metal oxide-hydrogen battery has been known so far as one of alkaline secondary batteries in which the metal oxide is utilized as a cathode active material and the hydrogen is utilized as an anode active material. As one of the metal oxide-hydrogen batteries, there has been a battery including and utilizing a hydrogen storage electrode, which reversively absorbs and releases hydrogens, as an anode active material.

The following have been known as processes for producing such a hydrogen storage electrode:

1. A sintering method in which a hydrogen storage alloy is sintered onto an electric current collecting substrate.

1.1 In one of the sintering methods, a $TiNi$-$Ti_2Ni$ alloy is employed. (Journal of the Less-Common Metals, 104 (1984) 365-373)

1.2 In another one of the sintering methods, an $AB_2$ type alloy such as $ZrMn_{0.6}Cr_{0.2}Ni_{1.2}$ is employed. (U.S. Pat. No. 4,728,586, U.S. Pat. No. 4,716,088 and European Patent Application No. 0293660A2)

The sintering method can be applied to the above-mentioned tenacious alloys, but it is not an appropriate method for a brittle alloy such as a lanthanum-nickel alloy ($LaNi_5$), a mischmetal nickel alloy ($MmNi_5$) and the like.

2. A mixing method in which a hydrogen storage alloy is mixed with a binder, i.e., polytetrafluoroethylene (hereinafter referred to as "PTFE"), polyvinyl alcohol (hereinafter referred to as "PVA"), sodium carboxylmethyl cellulose (hereinafter referred to as "CMC") and the like, for instance.

2.1 A hydrogen storage alloy powder is mixed with a PVA aqueous solution, thereby making a paste. The paste is then filled in a 3-D electrode substrate such as foamed nickel and the like. (Japanese Unexamined Patent Publication (KOKAI) No. 233967/1986, European Patent No. 0271043A1, and H. Ogawa, M. Ikoma, H. Kawano and I. Matsumoto, in Proc. 16th Int. Power Sources Symp., Bournemouth, September 1988, p. 393)

This method suffers from an expensive cost of the 3-D electrode substrate. In addition, the electrode is usable in a seald battery, but the hydrogen storage alloy powder comes off sharply when the thus made electrode is used in a vented battery electrolyte.

2.2 A hydrogen storage alloy powder is mixed with a fluororesin powder, and made into pellets. The pellets are hot-pressed onto an electric current collecting substance at a high temperature of approximately 300° C. (Japanese Unexamined Patent Publication (KOKAI) No. 64069/1986 and Japanese Unexamined Patent Publication (KOKAI) No. 101957/1986)

The following are the problems of this method: It is hard to make a large-sized electrode, and it requires the high temperature.

2.3 A hydrogen storage alloy powder is compounded with PTFE, and made into a sheet or a paste. The sheet or paste compound is press-bonded onto an electric current collecting substance. (Japanese Unexamined Patent Publication No. 16470/86, European Patent No. 0284063A1 and European Patent No. 0266162A2)

The following are the problems of this method: The PTFE is expensive, and the binding strength is not enough. Accordingly, the hydrogen storage alloy powder comes off sharply due to the repetition of charge and discharge.

2.4 A hydrogen storage alloy powder is mixed with a copper powder by an amount as much as 5 to 10 times by weight of the hydrogen storage alloy powder. The mixture is then molded under pressure. (H. Buchner, Energiespeicherung in Metallhydriden, Springer Verlag, Wien and New York 1982 and J. J. G. Willems, Philips J. Res., 39 (Suppl. 1) (1984) 1)

The following are the problems of this method: The energy density decreases sharply, and the bidning strength is not enough. Accordingly, the hydrogen storage alloy powder comes off sharply.

Although the hydrogen storage electrodes favorably absorb and release hydrogens, they should exhibit a low electric resistance. Accordingly, the hydrogen storage electrodes are molded after mixing a hydrogen storage alloy powder and a binder. However, as the charge and discharge cycle is repeated and the number of the charge and discharge cycles is accumulated, the hydrogen storage alloy powder is turned into fine particles. As a result, the capacities of the hydrogen storage electrodes deteriorate and the hydrogen storage electrodes themselves break up. Therefore, it is important to take extra care in the selection of the binder.

As good examples of the conventionally known binders, and as set forth in the paragraphs 2.2 and 2.3 above, the Japanese Unexamined Patent Publication (KOKAI) No. 101957/1986 discloses the fluororesin powder as the binder, and further the Japanese Unexamined Patent Publication No. 16470/1986 discloses the PTFE powder as the binder. These publications disclose a method in which the surface of a hydrogen storage alloy powder is coated with copper to make microcapsule, the microcapsule is compounded with the fluororesin powder (the binder), and the mixture is pressed and bound onto an electric current collecting substance to make a hydrogen storage electrode.

However, there have been the following problems even in the fluororesin bound type hydrogen storage electrodes disclosed in the above-mentioned prior art publications: The hydrogen storage alloy powder is turned into fine particles, thereby deteriorating the capacity thereof as the accumulation of the charge and discharge cycles, and the capacity is deteriorated sharply during a rapid electric discharge or a high rate electric discharge. The binder amount may be increased in order to overcome the problmes or improve the binding strength, i.e., the configuration stability. Whereby the configuration stability can be upgraded, namely the hydrogen storage alloy powder can be prevented from turning into fine particles and coming off, and whereby the disadvantage of the capacity deterioration, which results from the accumulation of the charge and discharge cycles or the cycle life deterioration, can be improved. However, if the binder amount is increased, the hydrogen storage alloy powder amount is decreased and the permeation of the battery electrolyte and the hydrogen ions is hindered. Accordingly, the electric resistance of the hydrogen storage electrode is increased and the capacity thereof is deteriorated during a high rate electric discharge.

Hence, it has been desired to make a hydrogen storage electrode having an excellent cycle life and being superior in a high rate electric discharging characteristic without increasing the binder amount or while increasing the binder amount as less as possible.

SUMMARY OF THE INVENTION

The present invention has been developed in view of the above-mentioned problems. It is therefore an assignment to and an object of the present invention to provide a hydrogen storage electrode having an excellent high rate electric discharging characteristic and cycle life and to provide a process for producing the same.

A process for producing a hydrogen storage electrode of a first mode according to the present invention comprises the steps of: coating the surface of hydrogen storage alloy powder with at least one of copper and nickel in a manner so that hydrogen is permeable, thereby making the hydrogen storage alloy powder into microcapsule; mixing the microcapsule with uncrosslinked silicone rubber; and pressure molding the mixture of the microcapsule and the uncrosslinked silicone rubber while holding the mixture with substance for collecting electric current, thereby completing the crosslinking of the uncrosslinked silicone rubber during or after the pressure molding.

Further, another process for producing a hydrogen storage electrode of a second mode according to the present invention comprises the steps of: coating the surface of hydrogen storage alloy powder with at least one of copper and nickel in a manner so that hydrogen is permeable, thereby making the hydrogen storage alloy powder into microcapsule; mixing the microcapsule with uncrosslinked silicone rubber and at least one powder for forming porosity selected from the group consisting of resin powder, metal powder and ceramic powder; and pressure molding the mixture of the microcapsule, the uncrosslinked silicone rubber and the powder for forming porosity while holding the mixture with substance for collecting electric current, thereby completing the crosslinking of the uncrosslinked silicone rubber during or after the pressure molding.

Thus, contrary to the prior art technologies, the hydrogen storage alloy particles are bound by a chemical reaction, i.e., the crosslinking of the silicone rubber, in the hydrogen storage electrode produced in accordance with the present invention, the binding strength are strong and the electrode strength are high. Therefore, the hydrogen storage alloy comes off in a lesser degree and the life thereof becomes long when the charge and discharge cycle is carried out repeatedly. In addition, since the hydrogen storage alloy powders are bound strongly but flexibly, it is possible to produce a hydrogen storage electrode having an excellent high rate electric discharging characteristic.

As for the hydrogen storage alloy powder, a titanium-nickel alloy powder such as $Ti_2Ni$-$TiNi$, a lanthanum-nickel alloy powder such as $LaNi_5$, a zirconium-nickel alloy powder such as $Zr_{1-x}Ti_xNi$ and the like may be employed. The average particle diameter thereof is preferred to fall in the range of 10 to 100 μm.

As for the amount of the copper or nickel coating, it is preferred to fall in the range of approximately 5 to 30% by weight with respect to the weight of the microcapsule, namely the weight of the hydrogen storage powder coated with the copper or nickel.

As for the silicone rubber, dimethyl silicone rubber, methyl vinyl silicone rubber, phenyl vinyl silicone rubber, fluorinated silicone rubber and the like may be employed.

As for the uncrosslinked silicone rubber, a one-component room temperature vulcanizable type silicone rubber, a two-component heat-vulcanizalbe type silicone rubber and the like may be employed. As for the one-component room temperature vulcanizable type silicone rubber, SE9155 produced by Toray Co., Ltd. and the like are available. As for the two-component heat-vulcanizable type silicone rubber, CY52-237 produced by Toray Co., Ltd. and the like are available. It is naturally preferred that the crosslinking of the silicone rubber is completed during the pressure molding or after the pressure molding.

As for the mixing amount of the silicone rubber, it is preferred to fall in the range of 3 to 20% by weight with respect to the total amount of the mixture. In particular, it is more preferred to fall in the range of 5 to 15% by weight. When the mixing amount is less than 3% by weight, no sufficient binding strength can be obtained. In addition, the resistance due to an unsufficient contact among the hydrogen storage alloy particles increases to deteriorate the capacity during a high rate electric discharging. When the mixing amount exceeds 20% by weight, the internal electric resistance increases to deteriorate the capacity during a high rate electric discharge, because the silicone rubbers are electric insulator.

As for the molding pressure, it is preferred to fall in the range of 50 to 300 $kgf/cm^2$. Especially, it is more preferred to fall in the range of 100 to 250 $kgf/cm^2$. When the molding pressure is less than 50 $kgf/cm^2$, the mechanical strength of the electrode deteriorates and no sufficient binding strength can be obtained. Accordingly, the microcapsules tend to easily come off. In addition to that, the contact resistance among the hydrogen storage alloy particles increases to deteriorate the capacity during a high rate electric discharge. When the molding pressure exceeds 300 $kgf/cm^2$, the microcapsules are disposed too densely to lose the porosity structure. Accordingly, the electrochemical absorbing and releasing of the hydrogen cannot be carried out smoothly. Further, the internal electric resistance increases to deteriorate the capacity during a high rate electric discharge.

As for the powder for forming porosity, at least one of the following may be employed: a resin powder or the dispersion thereof, a metal powder, a ceramic powder and the like. Here, it seems that the resin or the dispersion thereof may work as the binder similarly to the silicone rubber. However, it is assumed that the resin or the dispersion thereof forms microspaces between the boundary surfaces of the silicone rubbers due to the following: the elastic modulus difference resulting from pressurizing and depressurizing, the thermal expansion coefficient difference resulting from temperature variation, the wettability difference, and so on.

Having described so far, in the process for producing the hydrogen storage electrode of the first mode according to the present invention, since the hydrogen storage alloy powder turned into the microcapsule is compounded with the uncrosslinked silicone rubber and the crosslinking of the uncrosslinked silicone rubber is completed during the pressure molding or thereafter to form the hydrogen storage electrode, it is possible to improve both the capacity deterioration during a high rate electric discharge and the charge and discharge cycle life. This is verified by the results of the experiments hereinafter described.

The advantages are believed to probably result from the following: Since the silicone rubbers bind elastically the neighboring microcapsules, the deformations of the elctrode, the increase in the electric resistance resulting from the deformations thereof and the deterioration in the hydrogen permeability have been prevented from happening. Hence, the capacity of the hydrogen storage electrode has been prevented from deteriorating during a high rate electric discharge. In other words, it is believed that the deformations of the electrode have been suppressed by the large rubber elasticity of the silicone rubber, and the separation of the microcapsules from the binder or the separation of the microcapsules from themselves are prevented from happening by the silicone rubber. As a result, it is believed that the configuration stability of the electrode has improved and that a large-sized electrode exhibiting a great absolute deformation has been made possible to produce.

Similarly, the conventional binders made of PTFE, the fluororesin and the like follow the deformations of the elctrode and deform elastically, but in a lesser degree. However, since the elastic deformation limits of the binders are low, the binding between the binders and the microcapsules breaks up microscopically when the deformations of the microcapsules increase, namely the microcapsule holding strength of the binders degrades. Hence, it is believed that the configuration stability of a large-sized electrode is impaired and that the internal electric resistance increases to sharply deteriorate the capacity during a high rate electric discharge.

Further, according to the first mode of the present invention, since a heating operation, for instance, heating the raw materials at a high temperature of 300° C., is not required in the process for producing the hydrogen storage electrode, it is superior in the moldability and the economical efficiency when compared with the prior art technologies employing the fluororesin binders only.

In the process for producing the hydrogen storage electrode of the second mode according to the present invention, since the hydrogen storage alloy powder is compounded with the uncrosslinked silicone rubber and the powder for forming porosity and the crosslinking of the uncrosslinked silicone rubber is completed during the pressure molding or thereafter to form the hydrogen storage electrode, it is also possible to improve the capacity characteristic deteriorating during a high rate electric discharge. In addition, it is found that the number of the charge and discharge cycles for activating the electrode can be reduced. These are also verified by the results of the experiments hereinafter described.

Here, the silicone rubber has an excellent deformability following the deformations of the hydrogen storage alloy powder and an excellent binding strength, thereby absorbing the deformations of the hydrogen storage alloy powder resulting from a high rate electric discharging and thereby reducing the internal electric resistance loss. On the other hand, since the binding strength, i.e., the adhesiveness or the wettability, of the silicone rubber is so favorable, the surface of the hydrogen storage alloy powder might be coated with the silicone rubber almost completely, and there might arise possibility that the battery electrolyte and the hydrogen are less likely permeate into the electrode. However, in the process of the second mode according to the present invention, since the powder for forming porosity is compounded and generates the microspaces between the boundary surfaces of the silicone rubbers or the boundary surfaces between the silicone rubbers and the powder, thereby improving the above-mentioned permeability. As a result, it is supposed that the electric discharging characteristic of the hydrogen storage electrode has been improved while maintaining the configuration stability thereof.

Therefore, according to the process of the second mode of the present invention, a high configuration stability can be achieved by the elastic binding effect of the silicone rubber, and, at the same time, the capacity deterioration can be suppressed during a high rate electric discharge. Thus, the process of the second mode of the present invention is a very effective measure for enlarging a hydrogen storage electrode.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS OF THE INVENTION

Having generally described the present invention, a further understanding can be obtained by reference to certain specific preferred embodiments which are provided herein for purposes of illustration only and are not intended to be limiting unless otherwise specified.

The first mode of the present invention will be hereinafter described with reference to hydrogen storage electrodes according to the first through fourth and ninth preferred embodiments. Then, the second mode of the present invention will be thereafter described with reference to hydrogen storage electrodes according to the fifth through eighth preferred embodiments.

FIRST PREFERRED EMBODIMENT

In the first preferred embodiment, an alloy having the alloy composition of $LaNi_{2.5}Co_{2.4}Al_{0.1}$ was employed as the hydrogen storage alloy for an anode. This alloy was pulverized mechanically and screened to an alloy powder of 100 mesh or less. Then, the thus screened alloy powder was made into microcapsules by an electroless copper plating with an alkaline type copper plating solution (Okumo Chem. Ind., MAC Copper 500 A, B) comprising the following compositions: sodium hydroxide, potassium sodium tartrate, formaldehyde and copper sulfate. The plating amount was set at 20% by weight with respect to the plated alloy powder.

Then, an uncrosslinked silicone rubber was added as a binder to 4.5 grams of the thus copper plated alloy powder by an addition amount of approximately 10% by weight with respect to the weight sum of the alloy powder and the binder, i.e., an uncrosslinked silicone rubber. After the mixture was compounded and premolded into a substance having a sheet-like shape, the pre-molded the substance was interposed between nickel meshes, i.e., the electric current collecting substance according to the present invention, disposed on the both sides thereof and a pressure molding was carried out under a pressure of 200 kgf/cm$^2$ at a room temperature to produce a hydrogen storage electrode. Here, as for the uncrosslinked silicone rubber, the following one-component room temperature vulcanizable type of silicone rubbers were employed: SE9155, SE9158, SE737 and SE738 produced by Toray Co., Ltd., and KE45, KE42, KE3492 and KE3493 produced by Shin-etsu Kagaku Co., Ltd. Further, the following two-component heat-vulcanizable type of silicone rubbers were employed: CY52-237 and SE1700 produced by Toray Co., Ltd. Then, the hydrogen storage electrode was held under the pressure molding condition at 150° C. for 30 minutes in order to thermoset or crosslink the uncrosslinked silicone rubber. The hydrogen storage electrode was thus molded into a plate-shaped electrode having a size of 4 cm×3 cm and a thickness of approximately 1 mm. Moreover, a nickel electrode was prepared as a counter electrode, and the hydrogen storage electrode and the nickel electrode were immersed into a 6N potassium hydroxide aqueous solution. Thereafter, charge and discharge were carried out repeatedly in order to completely activate the hydrogen storage electrode. The thus activated hydrogen storage electrode had an initial capacity of approximately 900 mAh.

Figure 1:
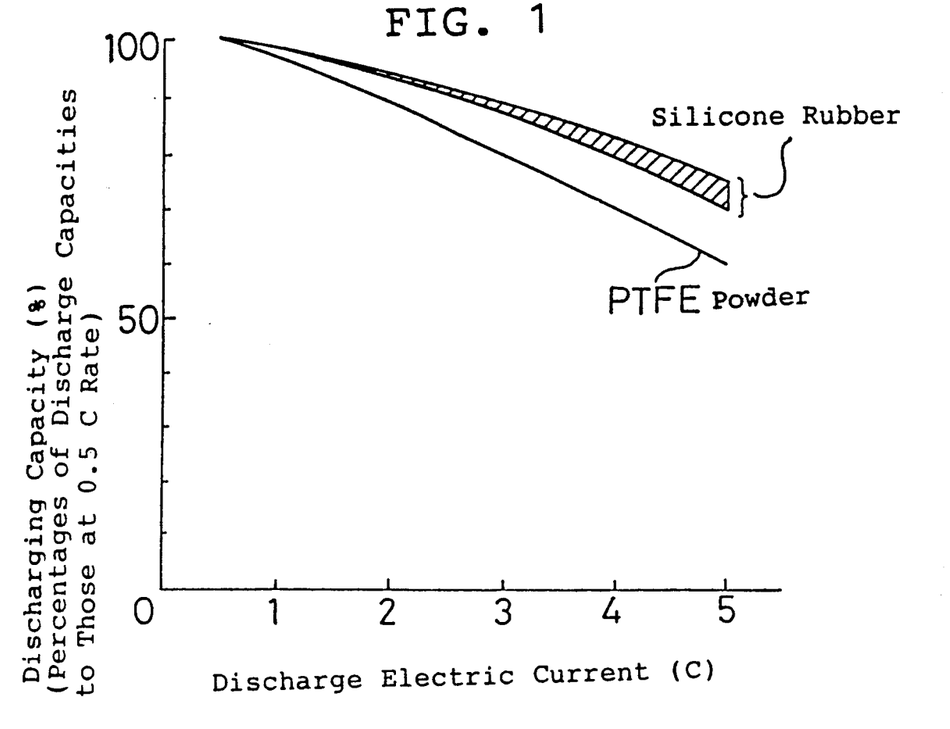
FIG. 1 shows characteristic curves illustrating discharge capacity deteriorations of batteries, which employ hydrogen storage electrodes produced by a process of a first preferred embodiment according to the first mode of the present invention, during a high rate electric discharge (1 C rate=350 mA)

Meanwhile, a sintered type nickel oxide plate having a capacity of 350 mAh was prepared as a cathode. The hydrogen storage electrode and the sintered type nickel oxide plate were placed on the opposite sides as an anode and a cathode respectively while being interposed by a separator comprising a non woven nylon cloth. The anode, cathode and the separator were then immersed into a battery electrolyte in which lithium hydroxide was solved by a rate of 1 mol/liter into a 5N potassium hydroxide aqueous solution. A plurality of cathode controlled batteries was thus produced by employing the hydrogen storage electrodes of the first preferred embodiment, and had a nominal capacity of 350 mAh. Charge and discharge current (I) was expressed by nC rate; $n[1/H]=I[mA]/nomical\ capacity\ [mAh]$ The thus produced batteries were charged at an electric current of 0.5 C for 3 hours at a temperature of 20° C., and then discharged to an end voltage of 0.8 V at discharge electric currents of 0.5 C, 1 C, 2 C, 3 C, 4 C and 5 C, in order to evaluate the battery capacity dependence on the discharge electric current. The results of this evaluation are illustrated in FIG. 1. Here, FIG. 1 illustrates the percentages of the discharge capacities at the respective discharge electric currents with respect to the discharge capacity at 0.5 coulombs. As for a comparative example, a hydrogen storage electrode was prepared under the same conditions as the above-mentioned hydrogen storage electrode of the first preferred embodiment except that a PTFE powder was employed instead of the uncrosslinked silicone rubber and that the hydrogen storage electrode of the comparative example was pressure molded under a molding pressure of 300 kgf/cm$^2$ at 300° C. Then, the hydrogen storage electrode of the comparative example was employed as an anode of a comparative battery in the same manner as the above-mentioned battery, and the comparative battery was evaluated similarly. When preparing the comparative hydrogen storage electrode, the addition amount of the PTFE powder was set at 5% by weight with respect to the sum of the copper plated hydrogen storage alloy powder and the PTFE powder.

The capacity characteristics of the batteries employing the hydrogen storage electrodes of the first preferred embodiment lie in the hatched area of FIG. 1. Here, the hydrogen storage electrodes of the first preferred embodiment comprised the silicone rubbers. It is apparent from the results of the evaluation that the capacity deteriorations of the batteries employing the hydrogen storage electrodes comprising the silicone rubbers were far less during the high rate electric discharging than that of the comparative battery employing the comparative hydrogen storage electrode comprising the PTFE powder.

SECOND PREFERRED EMBODIMENT

Figure 2:
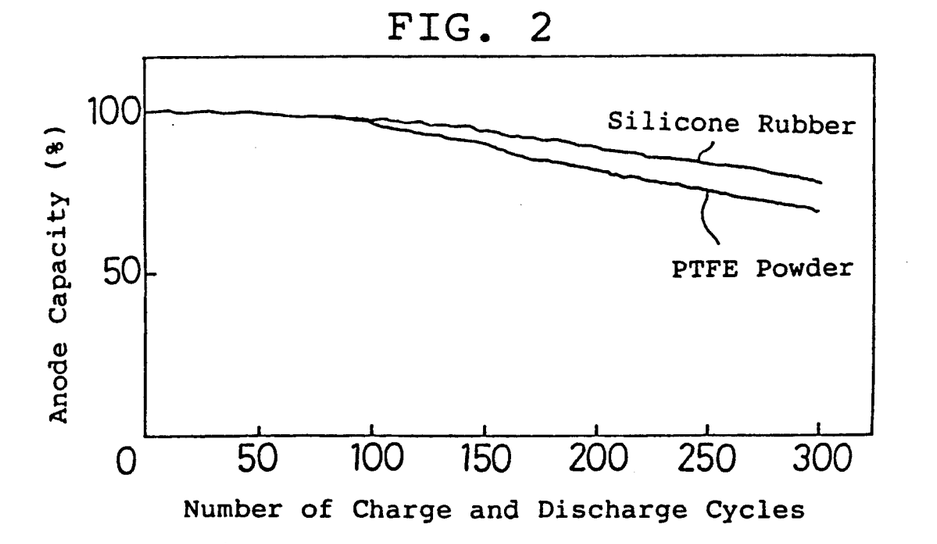
FIG. 2 shows a characteristic curve illustrating a charge and discharge cycle life of a hydrogen storage electrode produced by a process of a second preferred embodiment according to the first mode of the present invention.

Further, FIG. 2 illustrates a relationship between the number of charge and discharge cycles, i.e., the accumulation of the charge and discharge cycles, and the capacity deterioration, i.e., the anode capacity deterioration in a hydrogen storage electrode comprising a silicone rubber as the binder. The molding conditions and the like of this hydrogen storage electrode of the second preferred embodiment were identical with those of the first preferred embodiment.

When evaluating the charge and discharge cycle life of the hydrogen storage electrode of the second preferred embodiment, one charge cycle was carried out at an electric current of 400 mA for 3 hours and one discharge cycle was carried out at an electric current of 400 mA to an end voltage of 0.8 V. The above-mentioned comparative hydrogen storage electrode comprising the PTFE powder was also prepared to make a comparison between the charge and discharge cycle lives of these two hydrogen storage electrodes. It is apparent from the results of the evaluation that the hydrogen storage electrode of the second preferred embodiment comprising the silicone rubber had a far better charge and discharge life than that of the conventional hydrogen storage electrode comprising the PTFE powder as the binder.

THIRD PREFERRED EMBODIMENT

Figure 3:
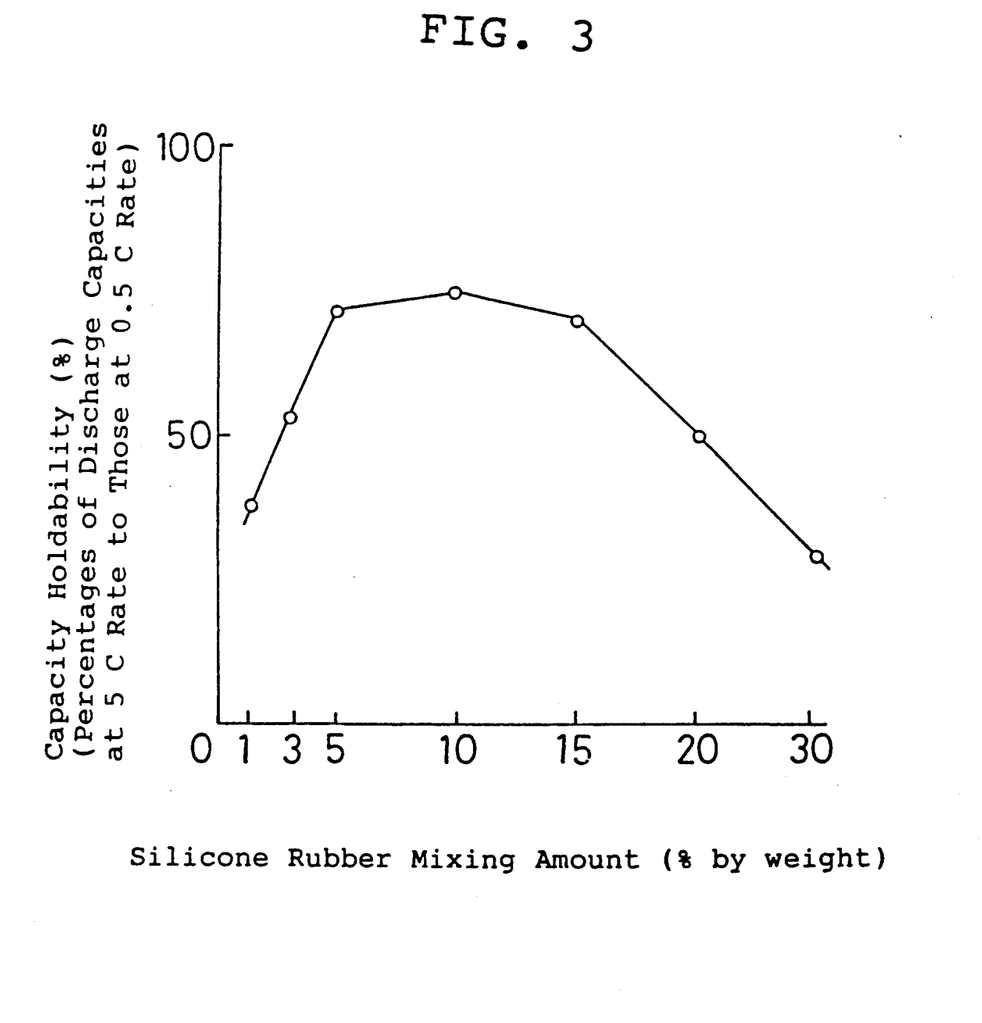
FIG. 3 shows a characteristic curve illustrating a relationship between the silicone rubber mixing amounts and the capacity holdabilities at 5 C rate electric discharge exhibited by a hydrogen occluding electrode produced by a process of a third preferred embodiment according to the first mode of the present invention.

Furthermore, FIG. 3 illustrates a relationship between the silicone rubber mixing amounts and the capacity holdabilities during a high rate electric discharge of a hydrogen strage electrode of the third preferred embodiment comprising a silicone rubber as the binder. Here, the capacity holdabilities were the percentages of the electric discharging capacities at an electric discharge of 5 C with respect to the electric discharge capacities at an electric discharge of 0.5 C. Other than the variety of the silicone rubber mixing amounts, the hydrogen storage electrode of the third preferred embodiment was prepared under the conditions identical with those of the first preferred embodiment.

It is apparent from FIG. 3 that the silicone rubber mixing amount is preferred to fall in the range of 3 to 20% by weight, and that it is more preferred to fall in the range of 5 to 15% by weight.

FOURTH PREFERRED EMBODIMENT

Figure 4:
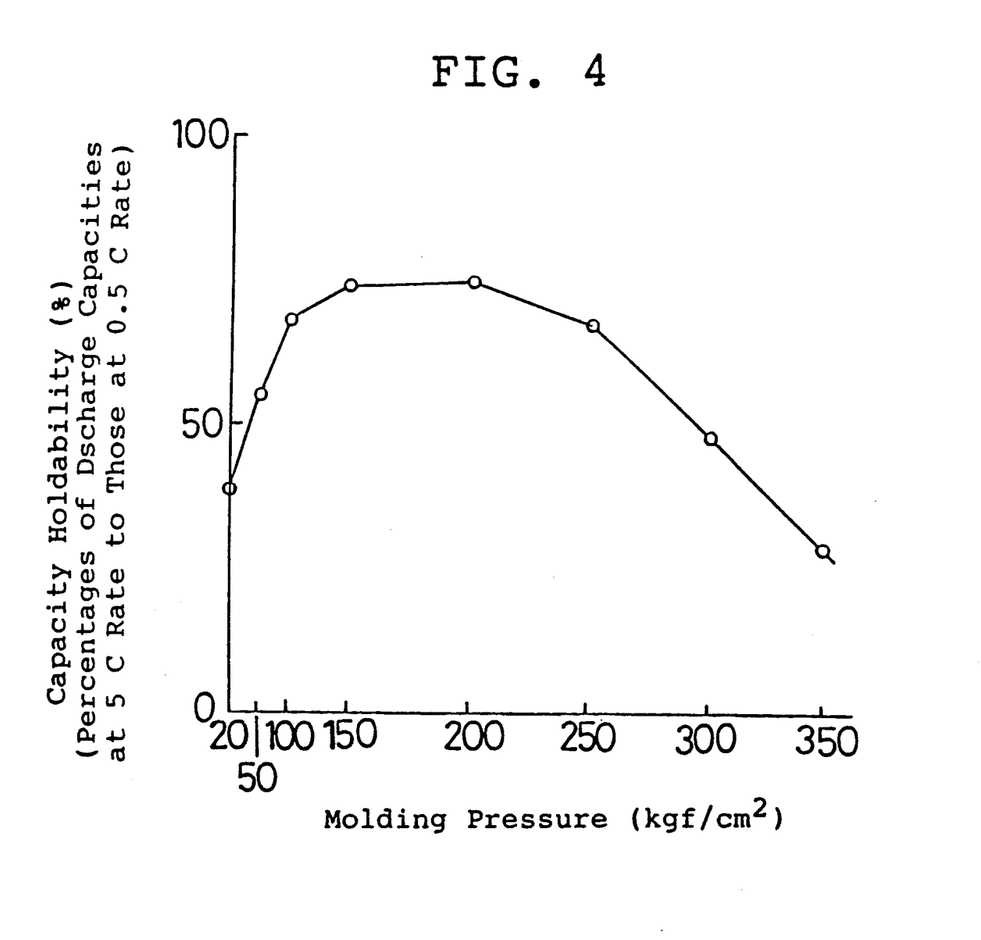
FIG. 4 shows a characteristic curve illustrating a relationship between the molding pressures and the capacity holdabilities at 5 C rate electric discharge exhibited by a hydrogen storage electrode produced by a process of a fourth preferred embodiment according to the first mode of the present invention.

FIG. 4 illustrates a relationship between the molding pressures and the capacity holdabilities at 5 C rate discharge of a hydrogen storage electrode of the fourth preferred embodiment comprising a silicone rubber as the binder. Also in FIG. 4, the capacity holdabilities were the percentages of the electric discharging capacities at an electric discharging of 5 C with respect to the electric discharging capacities at an electric discharging of 0.5 C. Other than the variety of the molding pressures, the hydrogen storage electrode of the fourth preferred embodiment was prepared under the conditions identical with those of the first preferred embodiment.

It is apparent from FIG. 4 that the molding pressure is preferred to fall in the range of 50 to 300 kgf/cm$^2$, and that it is more preferred to fall in the range of 100 to 250 kgf/cm$^2$.

FIFTH PREFERRED EMBODIMENT

In the fifth preferred embodiment, an alloy having the alloy composition of Mm $Ni_{3.5}Co_{0.7}Al_{0.8}$ (here, "Mm" is a mishmetal) was employed as the hydrogen storage alloy for an anode. This alloy was pulverized mechanically and screened to an alloy powder of 100 mesh or less. Then, the thus screened alloy powder was made into microcapsules by an electroless nickel plating with an alkaline type nickel plating solution (Okumo Chem. Ind., MAC Nickel 600 A, B) comprising the following compositions: nickel sulfate, ammonium, citric acid and sodium hypophosphite. The plating amount was set at 10% by weight with respect to the plated alloy powder.

Then, 0.35 grams of an uncrosslinked silicone rubber and 0.15 grams of a porosity forming powder were added to 4.5 grams of the thus nickel plated alloy powder. After the mixture was compounded and pre-molded into a substance having a sheet-like shape, the pre-molded substance was interposed between nickel meshes, i.e., the electric current collecting substance according to the present invention, disposed on the both sides thereof and a pressure molding was carried out under a pressure of 200 kgf/cm$^2$ at a room temperature to produce a hydrogen storage electrode.

Here, as for the uncrosslinked silicone rubber, the one-component room temperature vulcanizable type SE738 (produced by Toray Co., Ltd.) was employed. Other than SE738, the following one-component room temperature valcanizable silicone rubbers may be employed: SE9155, SE9158 and SE737 produced by Toray Co., Ltd., and KE45, KE42, KE3492 and KE3493 produced by Shin-etsu Kagaku Co., Ltd. In addition, the following two-component heat-vulcanizable type silicone rubbers may be employed: CY52-237 and SE1700 produced by Toray Co., Ltd. Then, the hydrogen storage electrode was held under the pressure molding condition at 150° C. for 30 minutes in order to crosslink these uncrosslinked silicone rubbers.

Further, as for the porosity forming powder, the following were employed independently in a form of powder or dispersion: PTFE (polytetrafluoroethylene), FEP (tetrafluoroethylene-hexafluoroethylene copolymer), carbon black, alumina, nickel, copper, polyvinilidene fluoride, sodium acrylate, raney nickel, CMC (sodium carboxymethyl cellulose), polyvinyl alcohol, polyamide, polyethylene, polypropylene, zirconia, stainless steel and cobalt.

The hydrogen storage electrode was thus molded into a plate-shaped electrode having a size of 4 cm × 3 cm and a thickness of approximately 1 mm. Moreover, a nickel electrode was prepared as a counter electrode, and the hydrogen storage electrode and the nickel electrode were immersed into a 6N potassium hydroxide aqueous solution. Thereafter, charge and discharge were carried out repeatedly in order to completely activate the hydrogen storage electrode. The thus activated hydrogen storage electrode had an initial capacity of approximately 900 mAh.

Meanwhile, a sintered type nickel oxide plate having a capacity of 350 mAh was prepared as a cathode. The hydrogen storage electrode and the sintered type nickel oxide plate were placed on the opposite sides as an anode and a cathode respectively while being interposed by a separator comprising a non woven nylon cloth. The anode, cathode and the separator were then immersed into a battery electrolyte in which lithium hydroxide was solved by a rate of 1 mol/liter into a 5N potassium hydroxide aqueous solution. A plurality of cathode controlled batteries was thus produced by employing the hydrogen storage electrodes of the fifth preferred embodiment, and had a nominal capacity of 350 mAh.

Hence, the weight ratio of the nickel plated alloy powder, the uncrosslinked silicone rubber and the porosity forming powder was 90:7:3 in the hydrogen storage electrodes of the fifth preferred embodiment.

Figure 5:
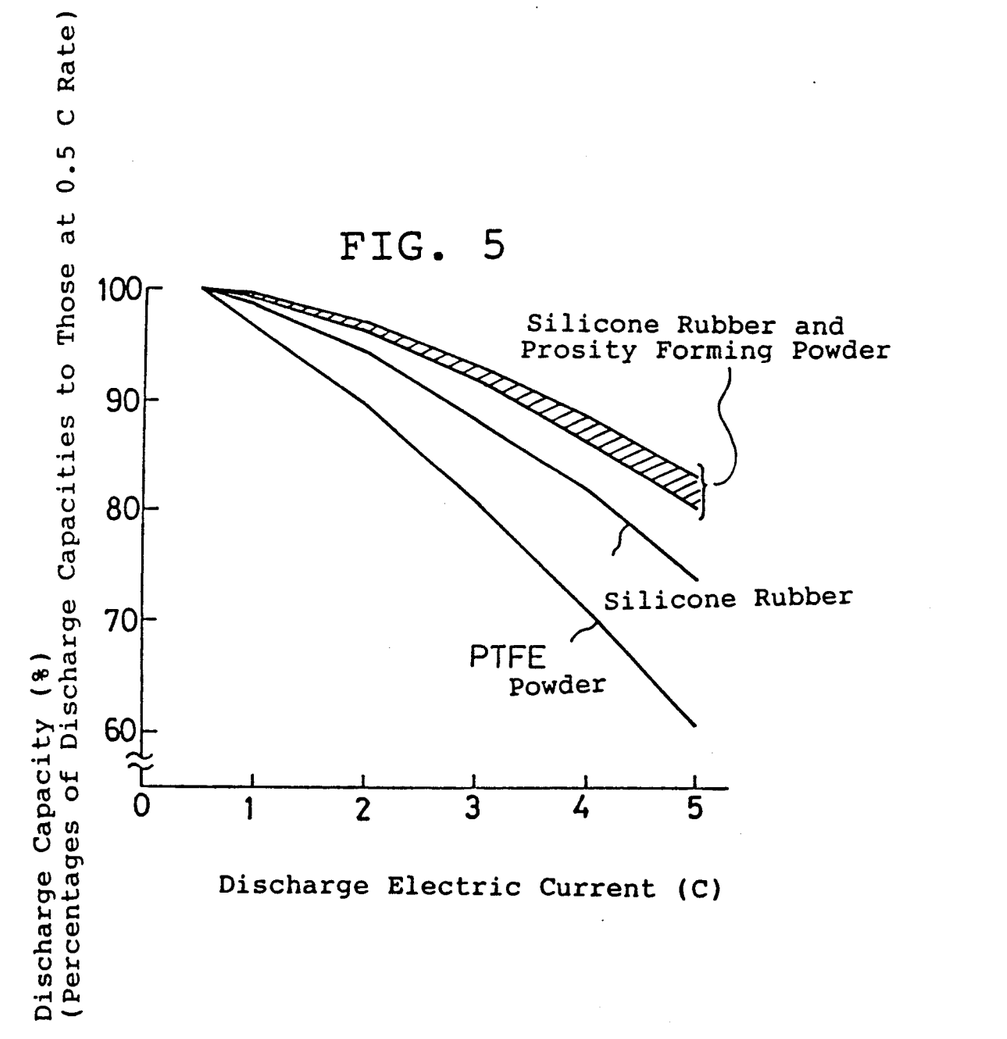
FIG. 5 shows characteristic curves illustrating discharge capacity deteriorations of batteries, which employ hydrogen storage electrodes produced by a process of a fifth preferred embodiment according to the second mode of the present invention, during a high reate elctric discharge (1 C=350 mA)

The thus produced batteries were charged at an electric current of 0.5 C at a temperature of 20° C. for 3 hours, and then discharged to an end voltage of 0.8 V at discharge electric currents of 0.5 C, 1 C, 2 C, 3 C, 4 C and 5 C, in order to evaluate the battery capacity dependence on the discharge electric current. The results of this evaluation are illustrated in FIG. 5. Here, another battery was prepared as a first comparative example. The another battery employed a hydrogen storage electrode in which 0.35 grams of the uncrosslinked silicone rubber was only added to 4.5 grams of the nickel plated alloy powder but no porosity forming powder was added. Further, a still another battery was prepared as a second comparative example. The battery of the second comparative example employed a still another hydrogen storage electrode which was prepared by exchanging the binder, i.e., the uncrosslinked silicone rubber, of the hydrogen storage electrode of the first comparative example with the PTFE powder and pressure molding at the temperature of 300° C. under the pressure of 300 kgf/cm$^2$. In the hydrogen storage electrode of the second comparative example, the PTFE powder was added by 5% by weight with respect to the sum of the nickel plated alloy powder and the PTFE powder. The batteries of the first and second comparative examples were evaluated in the same manner as the batteries of the fifth preferred embodiment were evaluated.

The discharge capacity characteristics of the batteries employing the hydrogen storage electrodes of the fifth preferred embodiment at the discharge electric currents lie in the hatched area of FIG. 5. Here, the hydrogen storage electrodes of the fifth preferred embodiment comprised the silicone rubber and the porosity forming powder. It is apparent from the results of the evaluation that the capacity deteriorations of the batteries employing the hydrogen storage electrodes comprising the silicone rubber and the porosity forming powder were far less during the high rate electric discharge than those of the first and second comparative batteries employing the hydrogen occluding electrodes which include either the PTFE powder or the silicone rubber only. The advantage is assumed that the microspaces are formed between the silicone rubber and the porosity forming powder whereby the hydrogen permeability is improved and the internal electric resistance is reduced.

SIXTH PREFERRED EMBODIMENT

Further, the hydrogen storage elctrodes of the sixth preferred embodiment were pressure molded as anodes under the same conditions as set forth in the fifth preferred embodiment, but the weight sum of the uncrosslinked silicone rubber and the porosity forming powder was fixed at 0.5 grams, and the weight ratio of the uncrosslinked silicone rubber to the porosity forming powder was varied variously. Then, batteries were produced with the anodes thus prepared under the same conditions as set forth in the fifth preferred embodiment.

Figure 6:
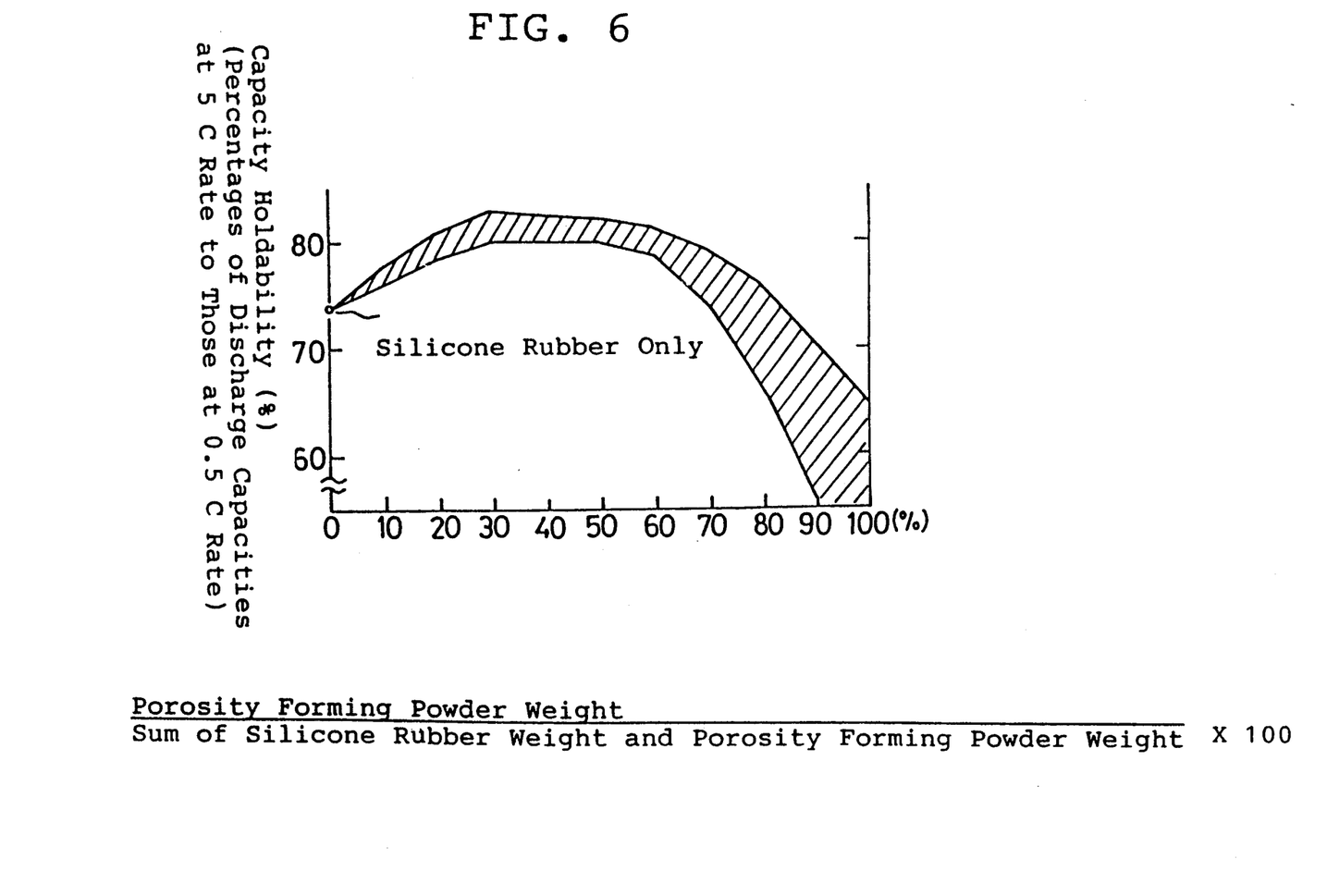
FIG. 6 shows characteristic curves illustrating relationships between the porosity forming powder weight and the capacity holdability at 5 C rate discharge exhibited by hydrogen storage electrodes produced by a process of a sixth preferred embodiment according to the second mode of the present invention.

FIG. 6 illustrates relationships between the weight of the porosity forming powder and the capacity holdabilities during the electric discharge at 5 C. Here, the capacity during the electric discharge at 0.5 C shall be 100%. It is apparent from FIG. 6 that the addition rate of the porosity forming powder is preferred to be from 5 to 80% by weight, and in particular from 20 to 60% by weight, with respect to the weight sum of the uncrosslinked silicone rubber and the porosity forming powder.

SEVENTH PREFERRED EMBODIMENT

Furthermore, the hydrogen storage electrodes of the seventh preferred embodiment were pressure molded as anodes under the same conditions as set forth in the fifth preferred embodiment, but the weight ratio of the uncrosslinked silicone rubber to the porosity forming powder was fixed at 7:3, and the ratio of the weight sum of the uncrosslinked silicone rubber and the porosity forming powder to the total weight, i.e., the weight sum of the nickel plated hydrogen storage alloy powder, the uncrosslinked silicone rubber and the porosity forming powder, was varied variously. Then, batteries were produced with the anodes thus prepared under the same conditions as set forth in the fifth preferred embodiment. For comparison, the batteries of the first and second comparative examples were prepared and evaluated as set forth in the fifth preferred embodiment.

Figure 7:
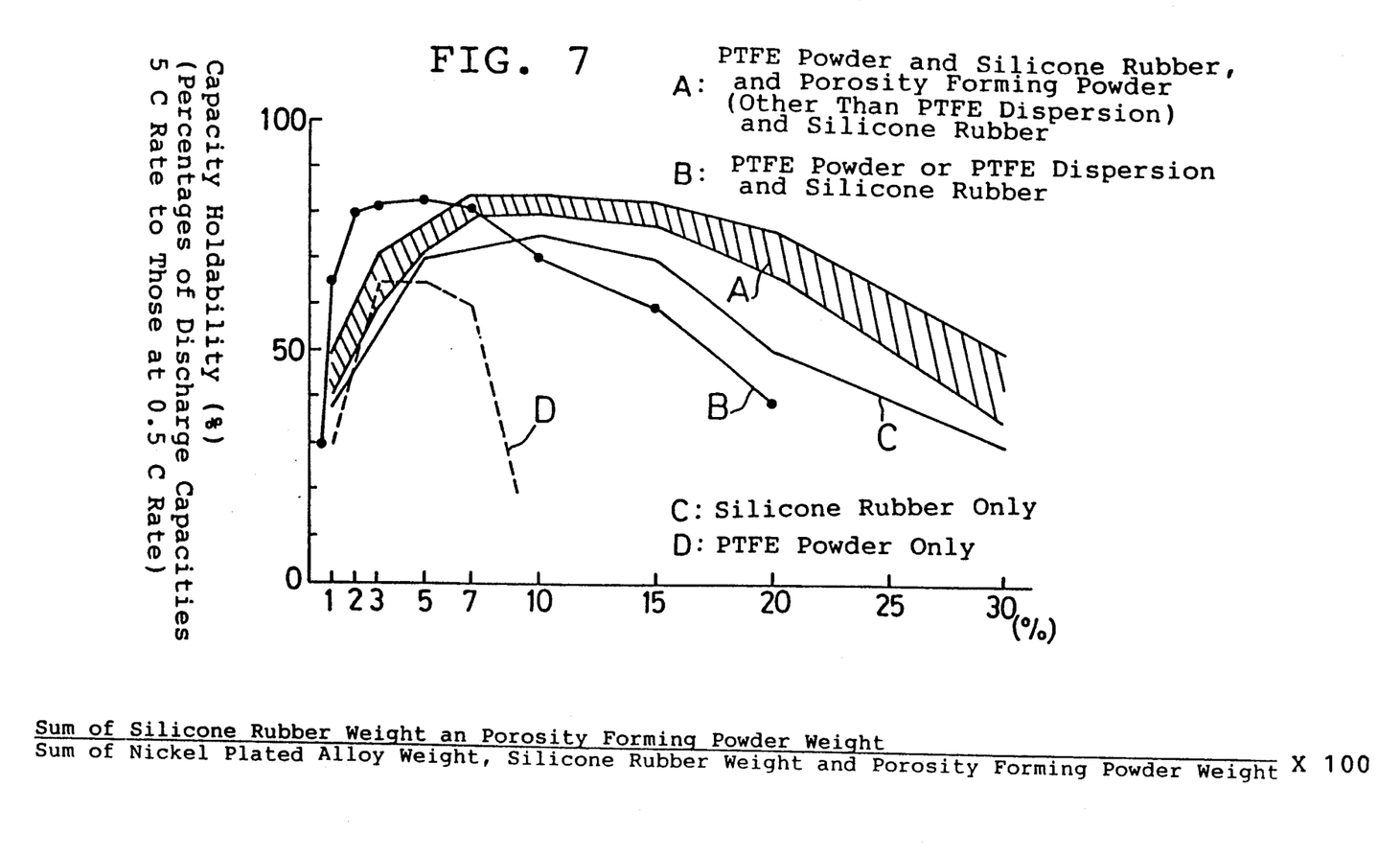
FIG. 7 shows characteristic curves illustrating relationships between the sum of the porosity forming powder weight and the silicone rubber weight and the capacity holdability at 5 C rate discharge exhibited by hydrogen storage electrodes produced by a process of a seventh preferred embodiment according to the second mode of the present invention.

FIG. 7 illustrates the results of the evaluation. According to the results of the evaluation, it is found that the above-mentioned ratio, namely the weight ratio of the weight sum of the uncrosslinked silicone rubber and the porosity forming powder to the total weight, is preferred to be from 1 to 15% by weight, in particular from 2 to 10% by weight, when the PTFE powder was employed as the porosity forming powder. In addition, it is also found that the above-mentioned ratio is preferred to be from 3 to 25% by weight, in particular from 5 to 20% by weight, when the porosity forming powders other than the PTFE powder were employed.

To put it differently, in the case that the PTFE powder is employed as the porosity forming powder, it is possible to obtain an excellent high rate electric discharging characteristic even when the weight sum of the uncrosslinked silicone rubber weight and the PTFE powder weight is set at a small value.

EIGHTH PREFERRED EMBODIMENT

Moreover, the same hydrogen storage electrodes evaluated in the fifth preferred embodiment were again produced in order to examine the relationships between the number of charge and discharge cycles required for the activation and the capacity increments. As a comparative example, an electrode, namely the first comparative example set forth in the fifth preferred embodiment in which no porosity forming powder was added and only the uncrosslinked silicone rubber was added, was also produced and evaluated under the same conditions.

The charge and discharge conditions were as follows: A charge and discharge cycle consisted of one charging cycle carried out at an electric current of 300 mA for 4.5 hours and one discharging cycle carried out at an electric current of 200 mA to an end voltage of 0.8 V.

Figure 8:
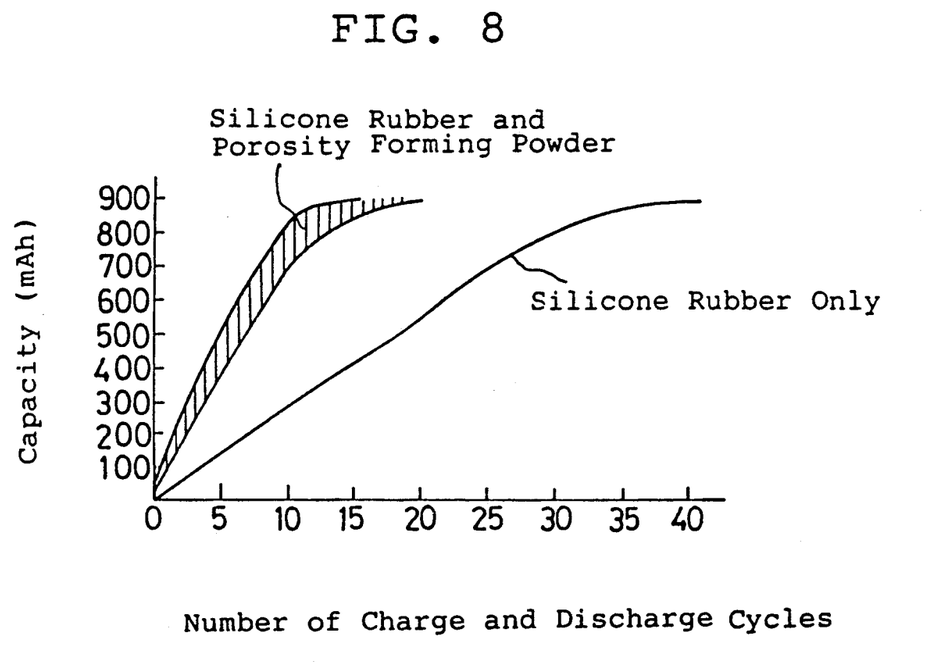
FIG. 8 shows characteristic curves illustrating how the number of the charge and discharge cycles for activating electrode is reduced by the addition of the porosity forming powder in the activation of hydrogen storage electrodes produced by a process of an eighth preferred embodiment according to the second mode of the present invention.

As illustrated in FIG. 8, it is found that the number of the charge and discharge cycles can be reduced remarkably when the porosity forming powder was added to the uncrosslinked silicone rubber. It is also assumed from FIG. 8 that a large number of the microspaces were formed by the addition of the porosity forming powder and that the hydrogen permeability and the electrode resistance were improved.

NINTH PREFERRED EMBODIMENT

Hydrogen storage electrodes "a" through "f" were produced as anodes in the same mannerr as set forth in the first preferred embodiment except that the copper plating amount was varied variously therein. Namely, when plating the hydrogen storage alloy powder with copper, the copper plating amounts were set at 20% by weight or more, 10% by weight, 5% by weight, 3% by weight, 1% by weight and 0% by weight with respect to the weight of the plated alloy powder in the hydrogen storage electrodes "a" through "f" respectively.

Figure 9:
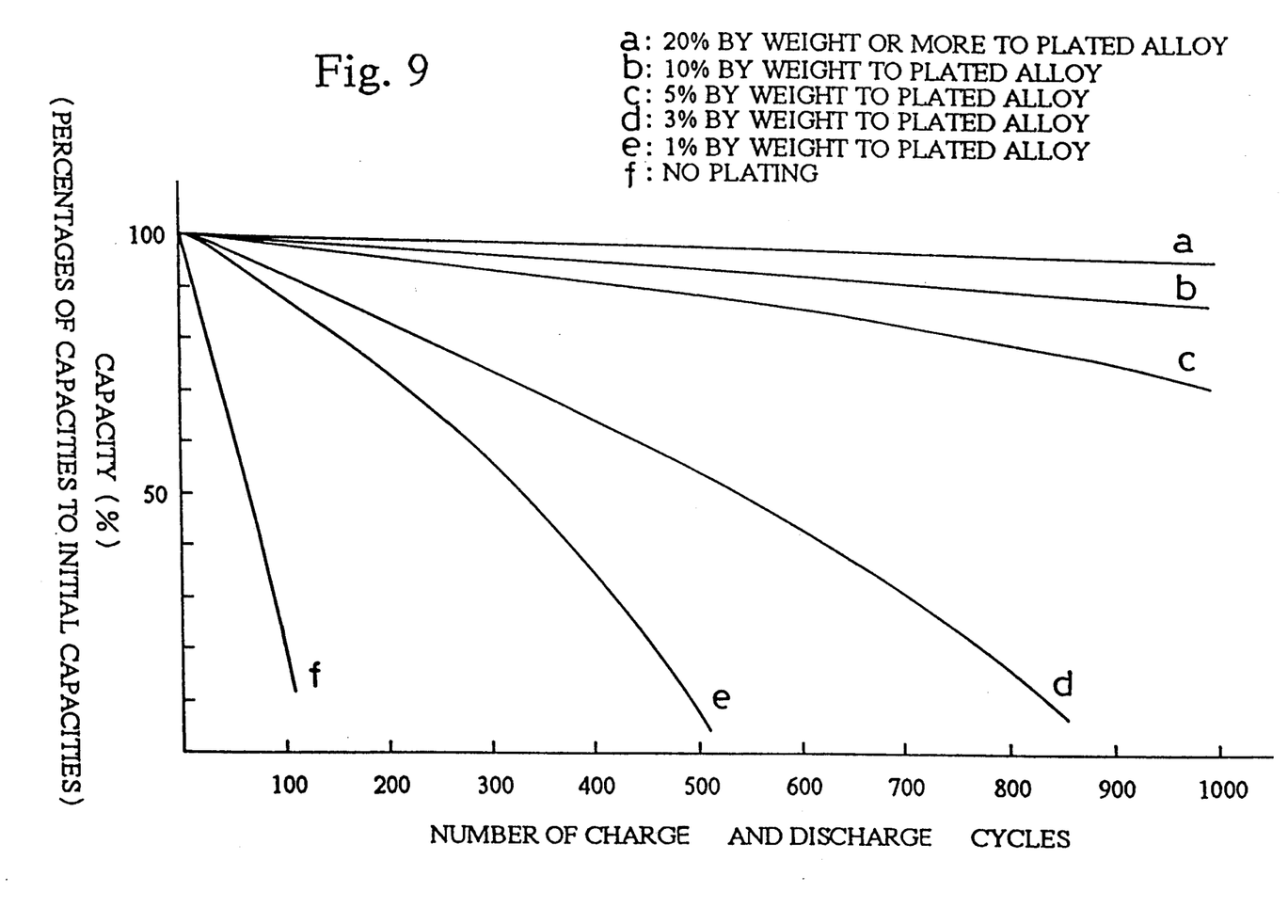
FIG. 9 shows characteristic curves illustrating how the relationships between the capacity percentages and the number of the charge and discharge cycles depend on the copper plating amounts.

Batteries were made with the hydrogen storage electrodes "a" through "f" in the same manner as set forth in the first preferred embodiment, and their charge and discharge cycle lives were evaluated similarly while controlling their anodes. The results of the evaluation are illustrated in FIG. 9.

It is apparent from the results of the evaluation that the copper plating amount is required to be 5% by weight or more with respect to the plated alloy powder. However, it is not desirable in view of the energy density and the cost performance when the copper plating amount exceeds 30% by weight. On the other hand, in the case that the copper plating amount is less than 5% by weight, the surface of the alloy powder is not believed to be fully covered with the copper, and accordingly the surface thereof is believed to be exposed. If such is the case, the silicone rubber is decomposed by carrying out the charge and discharge repeatedly. Accordingly, it is believed that the binding capability of the silicone rubber deteriorates, the alloy powder comes off, and the capacities of the batteries are degraded. During the evaluation on the batteries employing the hydrogen storage electrodes "d", "e" and "f", the following phenomena were confirmed: The silicone rubber was turned into the silicone oil, the silicone oil flowed out into the battery electrolyte, and the alloy powder came off sharply. Thus, it is necessary to plate a hydrogen storage alloy powder in the production of the silicone rubber bound type hydrogen storage electrode according to the present invention.

Having now fully described the present invention, it will be apparent to one of ordinary skill in the art that many changes and modifications can be made thereto without departing from the spirit or scope of the present invention as set forth herein.

What is claimed is:

1. A process for producing a hydrogen storage electrode comprising the steps of:
    coating the surface of hydrogen storage alloy powder with at least one of copper and nickel in a manner so that hydrogen is permeable, thereby making said hydrogen storage alloy powder into microcapsule;
    mixing said microcapsule with uncrosslinked silicone rubber; and
    pressure molding the mixture of said microcapsule and said uncrosslinked silicone rubber while holding said mixture with substance for collecting electric current, thereby completing the crosslinking of said uncrosslinked silicone rubber during or after said pressure molding.

2. A process for producing a hydrogen storage electrode comprising the steps of:
    coating the surface of hydrogen occluding alloy powder with at least one of copper and nickel in a manner so that hydrogen is permeable, thereby making said hydrogen storage alloy powder into microcapsule;
    mixing said microcapsule with uncrosslinked silicone rubber and at least one powder for forming porosity selected from the group consisting of resin powder, metal powder and ceramic powder; and
    pressure molding the mixture of said microcapsule, said uncrosslinked silicone rubber and said powder for forming porosity while holding said mixture with substance for collecting electric current, thereby completing the crosslinking of said uncrosslinked silicone rubber during or after said pressure molding.

3. The process for producing a hydrogen storage electrode according to claim 1 or 2, wherein said hydrogen storage alloy powder is at least one selected from the group consisting of a titanium-nickel alloy powder, a lanthanum-nickel alloy powder and a zirconium-nickel alloy powder.

4. The process for producing a hydrogen storage electrode according to claim 1 or 2, wherein the average particle diameter of said hydrogen storage alloy powder falls in the range of 10 to 100 $\mu$m.

5. The process for producing a hydrogen storage electrode according to claim 1 or 2, wherein the plating amount of said at least one of copper and nickel falls in the range of 5 to 30% by weight with respect to the weight of said microcapsule.

6. The process for producing a hydrogen storage electrode according to claim 1 or 2, wherein said uncrosslinked silicone rubber is at least one selected from the group consisting of dimethyl silicone rubber, methyl vinyl silicone rubber, phenyl vinyl silicone rubber and fluorinated silicone rubber.

7. The process for producing a hydrogen storage electrode according to claim 1 or 2, wherein said uncrosslinked silicone rubber is at least one of a one-component room temperature vulcanizable type silicone rubber and a two-component heat vulcanizable setting type silicone rubber.

8. The process for producing a hydrogen storage electrode according to claim 1 or 2, wherein the mixing amount of said uncrosslinked silicone rubber falls in the range of 3 to 20% by weight with respect to the total amount of said mixture.

9. The process for producing a hydrogen storage electrode according to claim 8, wherein said mixing amount of said uncrosslinked silicone rubber falls in the range of 5 to 15% by weight with respect to said total amount of said mixture.

10. The process for producing a hydrogen storage electrode according to claim 1 or 2, wherein said pressure molding is carried out at a molding pressure falling in the range of 50 to 300 kgf/cm$^2$.

11. The process for producing a hydrogen storage electrode according to claim 10, wherein said molding pressure falls in the range of 100 to 250 kgf/cm$^2$.

12. The process for producing a hydrogen storage electrode according to claim 2, wherein said powder for forming porosity is compounded in a form of at least one of powder and dispersion.

13. The process for producing a hydrogen storage electrode according to claim 2, wherein said resin powder is at least one selected from the group consisting of polytetrafluoroethylene, tetrafluoroethylene-hexafluoroethylene copolymer, polyvinilidene fluoride, sodium acrylate, sodium carboxymethyl cellulose, polyvinyl alcohol, polyamide, polyethylene and polypropylene.

14. The process for producing a hydrogen storage electrode according to claim 2, wherein said metal powder is at least one selected from the group consisting of nickel, copper, raney nickel, stainless steel and cobalt.

15. The process for producing a hydrogen storage electrode according to claim 2, wherein said ceramic powder is at least one selected from the group consisting of carbon black, alumina, and zirconia.

16. The process for producing a hydrogen storage electrode according to claim 2, wherein said powder for forming porosity is added by 5 to 80% by weight with respect to the weight sum of said uncrosslinked silicone rubber and said powder for forming porosity.

17. The process for producing a hydrogen occluding electrode according to claim 16, wherein said powder for forming porosity is added by 20 to 60% by weight with respect to the weight sum of said uncrosslinked silicone rubber and said powder for forming porosity.

18. A hydrogen storage electrode comprising:
microcapsule having hydrogen storage alloy powder coated with at least one of copper and nickel in a manner so that hydrogen is permeable;
binder having uncrosslinked silicone rubber; and
electrically conductive substance for collecting electric current.

19. The hydrogen storage electrode according to claim 18, further comprising at least one powder for forming porosity selected from the group consisting of resin powder, metal powder and ceramic powder.

* * * * *